United States Patent Office 3,433,741
Patented Mar. 18, 1969

3,433,741
POLYBUTENE-1 COMPOSITIONS CONTAINING LUBRICANTS AND METHOD OF USE THEREFOR
Jack M. Kincaid, Houston, Tex., assignor to Petro-Tex Chemical Corporation, Houston, Tex., a corporation of Delaware
No Drawing. Filed Oct. 26, 1967, Ser. No. 678,178
U.S. Cl. 252—12           16 Claims
Int. Cl. C10m 7/52, 7/34, 7/24

ABSTRACT OF THE DISCLOSURE

Method for supporting at least one moving surface; novel polybutene-1 compositions containing specified lubricants are disclosed.

BACKGROUND OF THE INVENTION

The present invention relates to novel butene-1 polymer compositions containing specified lubricants and to the use of these compositions for supporting moving surfaces. More particularly, the invention relates to novel polybutene-1 compositions containing a lubricant selected from the group comprising metal stearates, long chain aliphatic hydrocarbon waxes having from 20 to 32 carbon atoms, solid esters of long chain fatty acids with long chain alcohols, and solid fatty acid amides containing 16 to 18 carbons, and the use of such compositions as bearing materials.

The need has arisen in recent years for a low-cost support or bearing material suitable for use in low pressure, low velocity applications. While previously polyethylene compositions have been given consideration for these applications, indications of superior durability and resistance to cold flow by intermediate or high density polybutene-1 have stimulated interest in its potential use for these purposes. However, while polybutene-1 has excellent durability and resistance to wear, its potential use as a bearing material is limited by other considerations.

SUMMARY OF THE INVENTION

According to the present invention, the number of useful applications for polybutene-1 as a support material for moving surfaces have been increased substantially by the incorporation of a lubricating substance in the polymer. While it is not intended to limit the invention to any particular theory, it appears that the lubricating material renders the polybutene-1 composition self-lubricating or substantially self-lubricating. An additional feature of the invention is the improvement in extrusion characteristics of the polymer.

DESCRIPTION OF THE INVENTION

In general, the polymers employed in the invention are primarily isotactic polybutene-1 polymers having intermediate to high density and generally having a molecular weight of from about 450,000 to 750,000 on a weight average basis. The preferred polymers may be characterized further as containing more than 50 percent ether insolubles, having a density within the range of about 0.88 to about 0.92 (grams/cc. at 25° C.) (ASTM D 1238–57T), a melt index of from about 0.1 to about 5 (ASTM D 1238–57T), a yield strength of from about 1800 to about 3200 p.s.i. (ASTM D 638–58T), and a tensile strength of between about 3000 p.s.i. to about 6000 p.s.i. (ASTM D 638–58T modified). The melt index of such polymers at 190° F. is generally between 0.2 and 2.0 (ASTM D 1238–57T), with a Shore D hardness of between about 60 and 73 (ASTM D 1706–59T) and an elongation percent of between 200 and 400 percent (ASTM D 638–58T modified).

The preparation of the polybutene-1 polymer per se forms no part of the present invention and complete descriptions of process for preparation of these polymers may be found in U.S. Patent No. 3,184,442 to Nagel, issued May 18, 1965, and U.S. Patent No. 3,190,866 to Nagel et al., issued June 22, 1965. The novel compositions of the invention, however, may be prepared by physical incorporation of the lubricant into polymers of the type described, as for example, by blending the materials on a rubber mill. The compositions may then be formed into bearing structures in any suitable manner, such as by molding, extruding, or casting. A more detailed description of the preparation of the novel compositions of the present invention is given hereafter.

The amounts of lubricant employed in the compositions and method of the invention may be varied within a wide range of proportions, the only requirement being that sufficient amounts be employed to achieve good lubricity, i.e., lubricating amounts. Normally there will be from about 0.1 percent to 10.0 percent lubricant based on the weight of polybutene-1 present, with a lubricant content of from about 0.1 percent to about 5.0 percent representing a preferred content. A lubricant content of from about 0.5 percent to about 2.0 percent by weight gives excellent results. Mixtures of the lubricants may be utilized, the mixtures being used in amounts corresponding to that employed with the individual lubricants.

A wide variety of lubricants and lubricant types may be employed. It is preferred, however, that lubricants which are solid at ordinary temperatures be used. Particularly suitable lubricants, as noted above, are metal stearates, long chain aliphatic hydrocarbon waxes having from 20 to 32 carbon atoms, solid esters of fatty acids of 16 to 18 carbon atoms with long chain aliphatic alcohols of 16 to 18 carbons, and fatty acid amides containing from 16 to 18 carbons. In general, stearates which are useful in the invention include, but are not limited to, the elements of Groups Ia, IIa, and IIb. For example, the stearates of zinc, barium, lead (mono and dibasic), cadmium, lithium, sodium, and potassium may be employed. The preferred stearates are those of calcium, magnesium, and aluminum. Where waxes are employed, the preferred waxes are those long chain aliphatic hydrocarbon waxes having from 20 to 26 carbon atoms. The preferred esters and amides are those of stearic acid and oleic acid.

Example I

Approximately 438 grams of a primarily isotactic, intermediate density polybutene-1 polymer having a molecular weight of from about 450,000 to 750,000 on a weight average basis where fed on to a heated two-roll rubber mill maintained at a temperature sufficient to melt the polymer, i.e., approximately 325° F. After the polymer was melted, sufficient magnesium stearate to make the final product 4 percent by weight magnesium stearate, i.e., about 18 grams, was added to the molten polymer. The mixture was then milled for approximately fifteen minutes to achieve uniform dispersion of the stearate. The mixture was allowed to cool on the rubber mill and then was removed and allowed to cool further for about ten to fifteen minutes. The solidified product was then ground to reduce the size of the compound to small chunks about ⅛″ to ⅙″ in size and was then fed into a small extruder where the barrel heat was maintained at a constant 350° F. The product was extruded into a semi-positive, flashing mold and the mold was placed in a preheated press at 325° F. for approximately thirty minutes under minimum pressure. The heat was then turned off and the mass allowed to cool. During this stage moderate pressure was applied until the plastic mass was sufficiently cooled to permit increasing the pressure to approximately 25 tons of ram force without causing appreciable plastic flow out of the mold. The cylindrical disc product was then cooled to 120° F. under the above pressure. After aging for ten days, the composition is found to have good bearing characteristics and has good self-lubrication.

Example II

The procedure of Example I is repeated using 4 percent by weight of a hydrocarbon wax in place of the magnesium stearate. When the material is molded into a shape suitable for use as a bearing, the results obtained as far as bearing characteristics are concerned are similar to those obtained in Example I.

Example III

The procedure of Example I is repeated using 2 percent by weight oleamide (the amide of oleic acid) as a lubricant. Good bearing characteristics are obtained in the product material.

Example IV

The procedure of Example I is repeated using 4 percent by weight aluminum stearate instead of the magnesium stearate. The material exhibits good bearing characteristics.

If desired, other materials such as fillers and reinforcing agents may be incorporated into the novel compositions of the invention, it being recognized, of course, that materials which substantially adversely affect the properties of the compositions should not be added. For example, reinforcing agents such as glass and asbestos may be employed. Additionally, other polymers such as polyethylene and polypropylene may be blended in minor proportions, i.e., less than fifty percent of the total composition. The compositions disclosed herein are admirably suited for use in a variety of bearing types such as journal, thrust, and slide bearings.

While there are above disclosed but a limited number of embodiments of the method and compositions of the invention herein presented, it is possible to produce still other embodiments without departing from the inventive concept herein disclosed, and it is desired therefore that only such limitations be imposed on the appended claims as are stated therein, or required by the prior art.

I claim:

1. A bearing material comprising solid polybutene-1 having a density of from 0.87 to 0.93 gram per cubic centimeter and containing at least 0.1 percent of a lubricant.

2. The material of claim 1 wherein the lubricant is a solid lubricant selected from the group consisting of metal stearates, long chain aliphatic hydrocarbon waxes having from 20 to 32 carbon atoms, esters of fatty acids of 16 to 18 carbon atoms with long chain alcohols of 16 to 18 carbon atoms, and fatty acid amides containing from 16 to 18 carbon atoms.

3. The material of claim 1 wherein the lubricant is a solid metal stearate.

4. The material of claim 1 wherein the lubricant is selected from the group comprising long chain aliphatic hydrocarbon waxes containing from 20 to 32 carbons, esters of fatty acids containing 16 to 18 carbon atoms with long chain alcohols of 16 to 18 carbon atoms, and fatty acid amides containing from 16 to 18 carbon atoms.

5. The material of claim 3 wherein the lubricant is a stearate of metals selected from the group consisting of calcium, magnesium and aluminum.

6. The material of claim 3 wherein the lubricant is a stearate of zinc, lead, cadmium, barium, lithium, sodium, and potassium.

7. The material of claim 3 wherein the solid metal stearate is present in an amount of from about 0.1 percent to about 10 percent stearate by weight based on the weight of the polybutene-1.

8. The material of claim 3 wherein the lubricant is present in an amount of from about 0.1 percent to about 5.0 percent lubricant by weight based on the weight of the polybutene-1.

9. A bearing material comprising solid polybutene-1 having a density of 0.87 to 0.93 gram per cubic centimeter and containing from about 0.1 to about 10 percent by weight of a lubricant.

10. The material of claim 9 wherein the lubricant is a solid.

11. The material of claim 10 wherein the lubricant is selected from the group consisting of metal stearates, long chain aliphatic hydrocarbon waxes having from 20 to 32 carbon atoms, esters of fatty acids of 16 to 18 carbon atoms with long chain alcohols of 16 to 18 carbon atoms, and fatty acid amides containing from 16 to 18 carbon atoms.

12. The material of claim 11 wherein the lubricant is a metal stearate.

13. The material of claim 11 wherein the lubricant is selected from the group comprising long chain aliphatic hydrocarbon waxes containing from 20 to 32 carbons, esters of fatty acids containing 16 to 18 carbon atoms with long chain alcohols of 16 to 18 carbon atoms, and fatty acid amides containing from 16 to 18 carbon atoms.

14. The material of claim 11 wherein the lubricant is a stearate of metals selected from the group consisting of calcium, magnesium and aluminum.

15. The material of claim 1 wherein the lubricant is present in an amount of from about 0.5% to about 2.0% by weight based on the weight of the polybutene-1.

16. The material of claim 3 wherein the lubricant is present in an amount from about 0.5% to about 2.0% by weight based on the weight of the polybutene-1.

References Cited

UNITED STATES PATENTS

| | | | |
|---|---|---|---|
| 2,246,092 | 6/1941 | Gilman | 252—12.4 |
| 3,114,708 | 12/1963 | Morway et al. | 252—12 |
| 3,190,866 | 6/1965 | Nagel et al. | 260—93.7 |
| 3,184,442 | 5/1965 | Nagel et al. | 260—93.7 |
| 3,224,967 | 12/1965 | Battista | 252—12 |
| 3,325,405 | 6/1967 | Kamath et al. | 252—12 |

DANIEL E. WYMAN, Primary Examiner.

L. VAUGHN, Assistant Examiner.